(12) United States Patent
Ferguson

(10) Patent No.: US 7,343,011 B2
(45) Date of Patent: Mar. 11, 2008

(54) SECURE TELECOMMUNICATIONS SYSTEM FOR WIRELESS LOCAL AREA NETWORKS

(75) Inventor: Niels Thomas Ferguson, Amsterdam (NL)

(73) Assignee: Conexant, Inc., Red Bank, NJ (US)

( * ) Notice: Subject to any disclaimer, the term of this patent is extended or adjusted under 35 U.S.C. 154(b) by 780 days.

(21) Appl. No.: 10/424,803

(22) Filed: Apr. 29, 2003

(65) Prior Publication Data

US 2004/0008840 A1    Jan. 15, 2004

Related U.S. Application Data

(60) Provisional application No. 60/396,286, filed on Jul. 15, 2002.

(51) Int. Cl.
*H04L 9/00* (2006.01)

(52) U.S. Cl. ....................................................... 380/28

(58) Field of Classification Search ..................... None
See application file for complete search history.

(56) References Cited

U.S. PATENT DOCUMENTS

| 5,727,064 | A | 3/1998 | Reeds |
| 5,966,450 | A | 10/1999 | Hosford et al. |
| 6,075,860 | A * | 6/2000 | Ketcham ..................... 713/159 |
| RE36,946 | E | 11/2000 | Diffie et al. |
| 6,201,871 | B1 | 3/2001 | Bostley, III et al. |
| 6,304,657 | B1 * | 10/2001 | Yokota et al. ................. 380/28 |
| 6,304,658 | B1 * | 10/2001 | Kocher et al. ................. 380/30 |
| 6,314,186 | B1 | 11/2001 | Lee et al. |
| 6,415,032 | B1 | 7/2002 | Doland |

* cited by examiner

*Primary Examiner*—Nasser Moazzami
*Assistant Examiner*—Pramila Parthasarathy
(74) *Attorney, Agent, or Firm*—Thomas, Kayden, Horstemeyer & Risley (57) ABSTRACT

A security mechanism suitable for wireless local area networks is disclosed that exhibits a reasonable trade-off between computation speed and resistance to attack. The illustrative embodiment can be implemented with operations that are quickly performed on most processors, and, therefore be in many cases reasonably implemented in software. The illustrative embodiment comprises modulo 2 additions, modulo $2^B$ additions, bit rotations, and byte transpositions.

19 Claims, 7 Drawing Sheets

SECURE TELECOMMUNICATIONS SYSTEM FOR WIRELESS LOCAL AREA NETWORKS

CROSS REFERENCE TO RELATED APPLICATIONS

This application claims the benefit of U.S. Provisional Patent Application 60/396,286 filed Jul. 15, 2002, which is incorporated by reference.

FIELD OF THE INVENTION

The present invention relates to telecommunications in general, and, more particularly, to a cryptographic authentication system suitable for wireless local area networks.

BACKGROUND OF THE DISCLOSURE

IEEE 802.11 is a wireless local area network protocol standard that includes a security mechanism called Wireless Equivalent Privacy or "WEP." The goal of the IEEE 802.11's Wireless Equivalent Privacy was to provide a degree of privacy and authentication for transmissions that is "equivalent" to that provided by physical wiring.

Unfortunately, the IEEE 802.11's Wireless Equivalent Privacy is flawed and an eavesdropper or spoofer can easily circumvent it. Therefore, the need exists for an improved security mechanism.

SUMMARY OF THE DISCLOSURE

The present invention provides a secure telecommunications system that avoids some of the costs and disadvantages associated with secure telecommunications systems in the prior art. In particular, the illustrative embodiment of the present invention exhibits a reasonable trade-off between computation speed and resistance to attack. The illustrative embodiment can be implemented with operations that are quickly performed on most processors, and can, therefore, be reasonably implemented in software. The illustrative embodiment comprises modulo 2 additions, modulo $2^B$ additions, bit rotations, and transpositions.

The illustrative embodiment comprises a method for transforming a first message integrity codeword, L, and a second message integrity codeword, R, said method comprising:

1) setting said second message integrity codeword, R, equal to the modulo 2 sum of said second message integrity codeword, R, plus said first message integrity codeword, L, after being rotated left 17 bits;
2) setting said first message integrity codeword, L, equal to the modulo $2^B$ sum of said first message integrity codeword, L, plus said second message integrity codeword, R;
3) setting said second message integrity codeword, R, equal to the modulo 2 sum of said second message integrity codeword, R, plus a transposition of said first message integrity codeword, L;
4) setting said first message integrity codeword, L, equal to the modulo $2^B$ sum of said first message integrity codeword, L, plus said second message integrity codeword, R;
5) setting said second message integrity codeword, R, equal to the modulo 2 sum of said second message integrity codeword, R, plus said first message integrity codeword, L, after being rotated left 3 bits;
6) setting said first message integrity codeword, L, equal to the modulo $2^B$ sum of said first message integrity codeword, L, plus said second message integrity codeword, R;
7) setting said second message integrity codeword, R, equal to the modulo 2 sum of said second message integrity codeword, R, plus said first message integrity codeword, L, after being rotated right 2 bits; and
8) setting said first message integrity codeword, L, equal to the modulo $2^B$ sum of said first message integrity codeword, L, plus said second message integrity codeword, R; wherein B is a positive integer.

DETAILED DESCRIPTION

Figure 1:
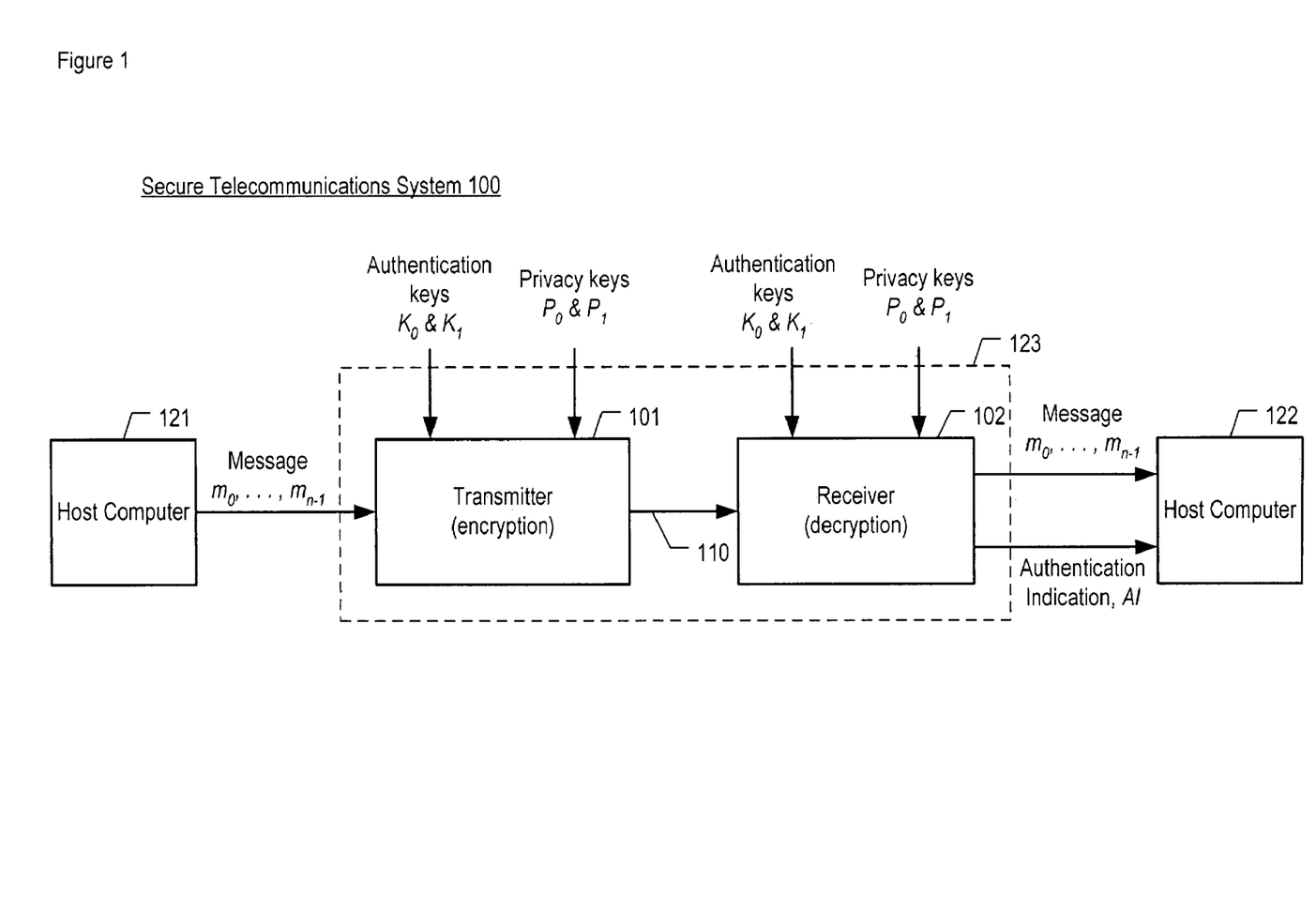
FIG. 1 depicts a block diagram of the salient components of secure telecommunications system 100 in accordance with the illustrative embodiment of the present invention.

FIG. 1 depicts a block diagram of the salient components of secure telecommunications system 100 in accordance with the illustrative embodiment of the present invention. Secure telecommunications system 100 comprises host computer 121 and host computer 122, which are connected via cryptographic telecommunications system 123. Cryptographic telecommunications system 123 comprises transmitter 101, communications channel 110, and receiver 102, interconnected as shown.

Host computer 121 is a computer system such as a desktop, notebook, or stylus-based machine, or even a network-based peripheral such as a printer, scanner, fax machine, or server. It will be clear to those skilled in the art how to make and use host computer 121.

Host computer 122 is a computer system such as a desktop, notebook, or stylus-based machine, or even a network-based peripheral such as a printer, scanner, fax machine, or server. It will be clear to those skilled in the art how to make and use host computer 122. Either or both of host computer 121 and host computer 122 can be a network access point.

Transmitter 101 receives an n byte message, $m_0, \ldots, m_{n-1}$, a B-Bit authentication key, $K_0$, a B-Bit authentication key, $K_1$, a B-Bit privacy key, $P_0$, and a B-Bit privacy key, $P_1$, wherein B and n are positive integers. In accordance with the illustrative embodiment, B=32, but it will be clear to those skilled in the art how to make and use embodiments of the present invention that have different values for B.

From these, transmitter generates a ciphertext message, C, that can be transmitted over communications channel 110 to receiver 102. Receiver 102 receives the ciphertext message, C, the authentication keys $K_0$ and $K_1$, and the privacy keys $P_0$ and $P_1$, and from them recovers the message, $m_0, \ldots, m_{n-1}$, and a 1-bit authentication indication, AI. The authentication indication, AI, indicates whether receiver 102 was able to authenticate that the ciphertext message, C, did, in fact, originate with an entity that had access to the authentication keys $K_0$ and $K_1$. It will be clear to those skilled in the art how to make and use alternative embodiments of the present invention that have different length authentication keys and different length privacy keys.

The details of transmitter 101 are described in detail below and with respect to FIGS. 2 through 5. The details of receiver 102 are described in detail below and with respect to FIGS. 6 and 7. It will be clear to those skilled in the art how to make and use communications channel 110.

Figure 2:
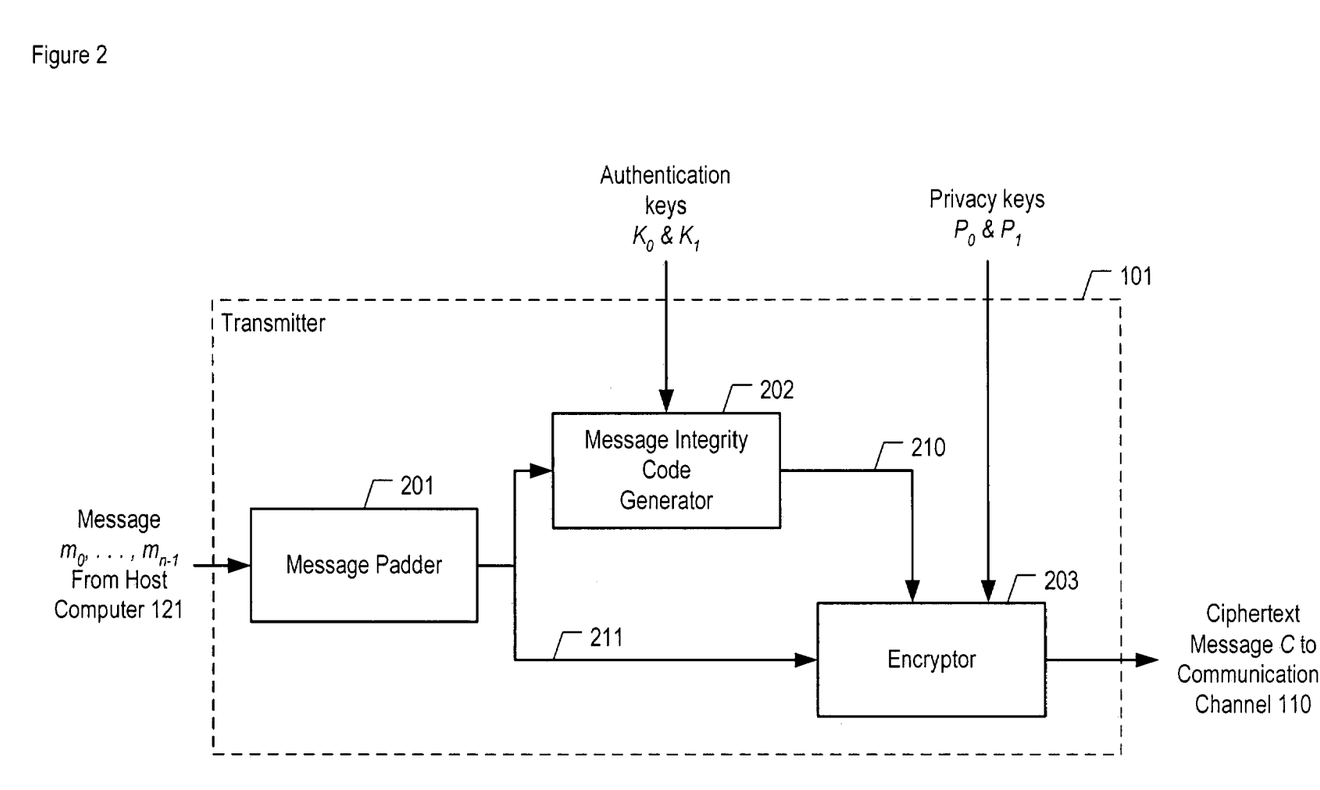
FIG. 2 depicts a block diagram of the salient components of transmitter 101 in accordance with the illustrative embodiment.

FIG. 2 depicts a block diagram of the salient components of transmitter 101 in accordance with the illustrative embodiment. Transmitter 101 comprises message padder 201, message integrity code generator 202, and encryptor 203, which are interconnected as shown. In accordance with the illustrative embodiment, message padder 201 and message integrity code generator 202 are implemented in software on a general-purpose processor, and encryptor 203 is implemented in special-purpose hardware. It will be clear to those skilled in the art, however, after reading this disclosure, how to make and use alternative embodiments of the present invention in which message padder 201, message integrity code generator 202, and encryptor 203 are implemented in any combination of software, general-purpose hardware, and special-purpose hardware. The operation of transmitter 101 is described in detail below and with respect to FIGS. 3, 4, and 5.

Figure 3:
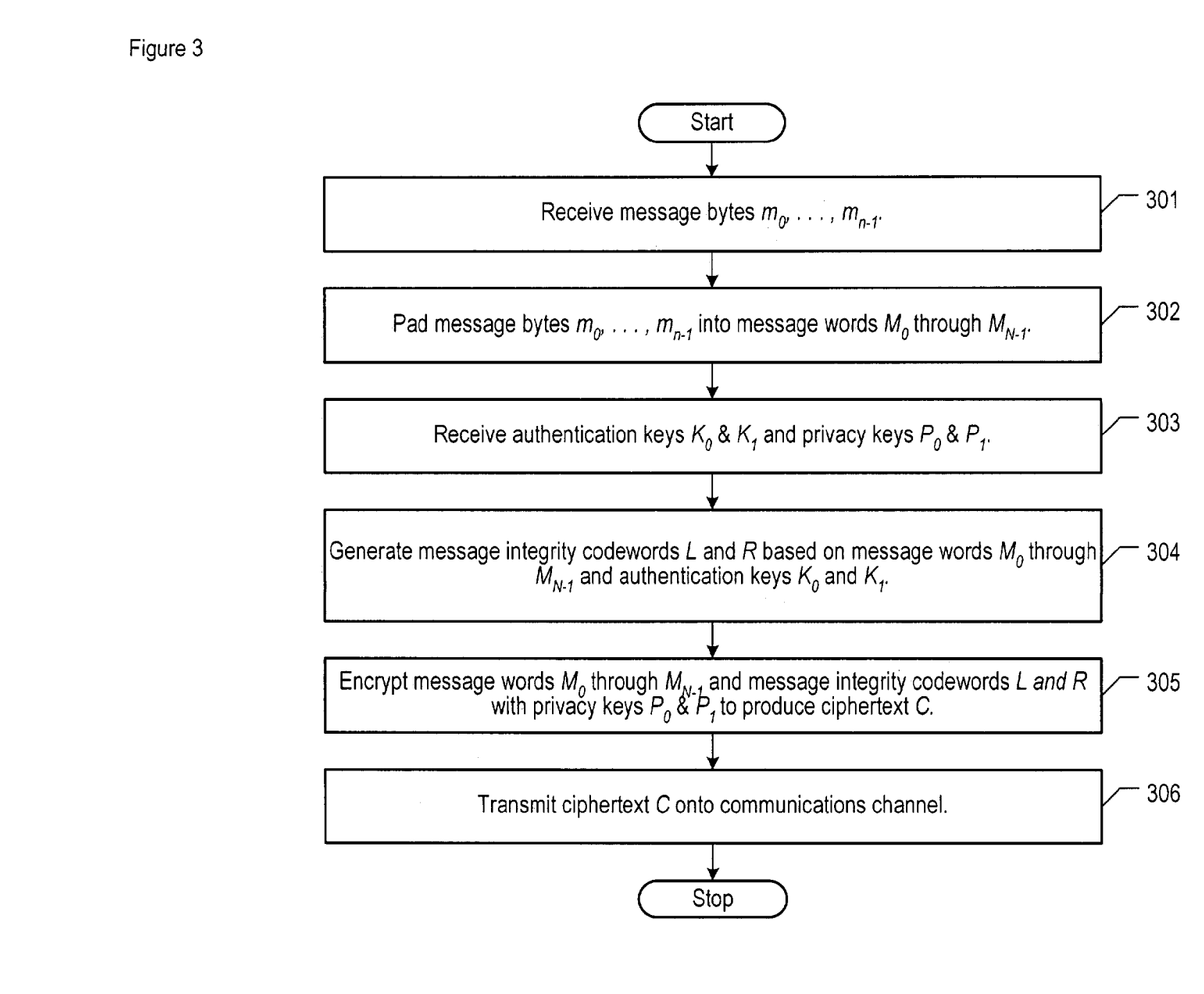
FIG. 3 depicts a flowchart of the salient tasks performed by transmitter 101 in accordance with the illustrative embodiment.

FIG. 3 depicts a flowchart of the salient tasks performed by transmitter 101 in accordance with the illustrative embodiment.

At task 301, message padder 201 receives an n byte message, $m_0, \ldots, m_{n-1}$, which represents the plaintext message to be transmitted securely to receiver 102.

At task 302, message padder 201 pads the message, $m_0, \ldots, m_{n-1}$, at the end with a single byte with the value 0x5a and then between 4 and 7 zero bytes. The number of bytes is chosen so that the overall length of the message plus the padding is a multiple of 4. The message is then converted to a sequence of B-Bit words $M_0, \ldots, M_{N-1}$ wherein $N:=\lceil(n+5)/4\rceil$. It will be clear to those skilled in the art, however, how to make and use alternative embodiments of the present invention that use different padding systems.

At task 303, message integrity code generator 202 receives the authentication keys $K_0$ and $K_1$, and encryptor 203 receives the privacy keys $P_0$ and $P_1$. It will be clear to those skilled in the art how to make and use alternative embodiments of the present invention in which tasks 301 and 302 and task 303 are performed concurrently or in a different order.

At task 304, message integrity code generator 202 generates the first message integrity codeword, L, and the second message integrity codeword, R, based on the message words $M_0, \ldots, M_{N-1}$, and the authentication keys $K_0$ and $K_1$. The procedure that message integrity code generator 202 uses to generate the first message integrity codeword, L, and the second message integrity codeword, R, is described in detail below and with respect to FIGS. 4 and 5.

At task 305, encryptor 203 encrypts, in well-known fashion, the message words $M_0, \ldots, M_{N-1}$, and the first message integrity codeword, L, and the second message integrity codeword, R, with the privacy keys $P_0$ and $P_1$, as the key in accordance with RC4 symmetric cryptosystem to produce the ciphertext message C. It will be clear to those skilled in the art how to make and use embodiments of the present invention that use other cryptosystems.

At task 306, transmitter 101 transmits the ciphertext message C onto communications channel 110 in well-known fashion.

Figure 4:
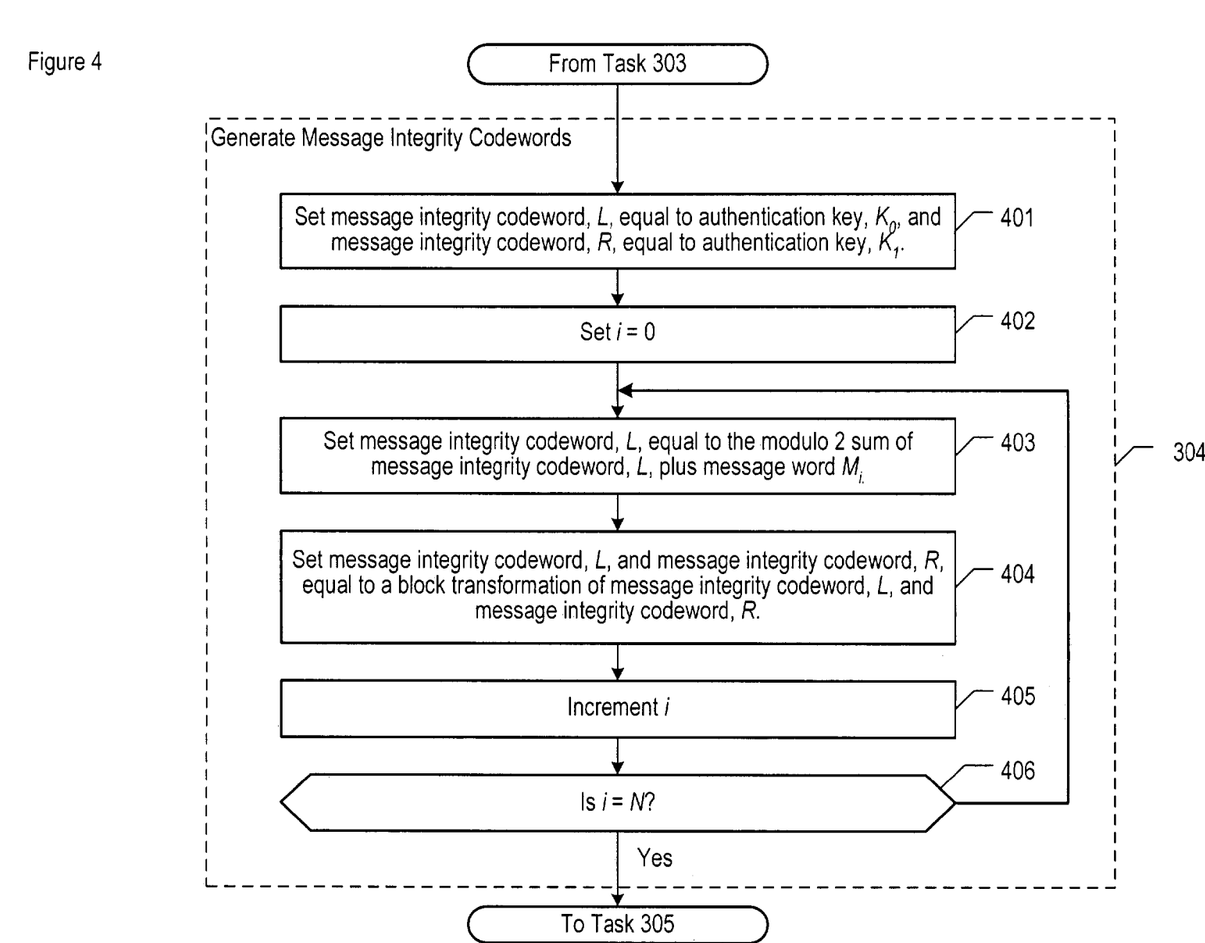
FIG. 4 depicts a flowchart of the salient subtasks performed in task 304.

FIG. 4 depicts a flowchart of the salient subtasks performed in task 304.

At subtask 401, message integrity codeword generator 202 initializes the first message integrity codeword, L, and the second message integrity codeword, R, by setting the first message integrity codeword, L, equal to the first authentication key, $K_0$, and by setting the second message integrity codeword, R, equal to the second key, $K_1$.

At subtask 402, message integrity codeword generator 202 sets a placeholder variable i equal to zero, wherein i is a non-negative integer, as shown in Equation 1.

$$i := 0 \tag{Eq. 1}$$

At subtask 403, message integrity codeword generator 202 sets the first message integrity codeword, L, equal to the modulo 2 sum of the first message integrity codeword, L, plus message word $M_i$, as shown in Equation 2.

$$L := L \oplus M_i \tag{Eq. 2}$$

At subtask 404, message integrity codeword generator 202 sets the first message integrity codeword, L, and the second message integrity codeword, R, equal to a block transformation of the first message integrity codeword, L, and the second message integrity codeword, R, as shown in Equation 3.

$$(L, R) := b(L, R) \tag{Eq. 3}$$

This transformation is described in detail below and with respect to FIG. 5.

At subtask 405, message integrity codeword generator 202 increments the value of the variable i.

At subtask 406, message integrity codeword generator 202 checks whether the value of the variable i is equal to N. If it is, then task 304 ends and control proceeds to task 305; otherwise control returns to subtask 403.

Figure 5:
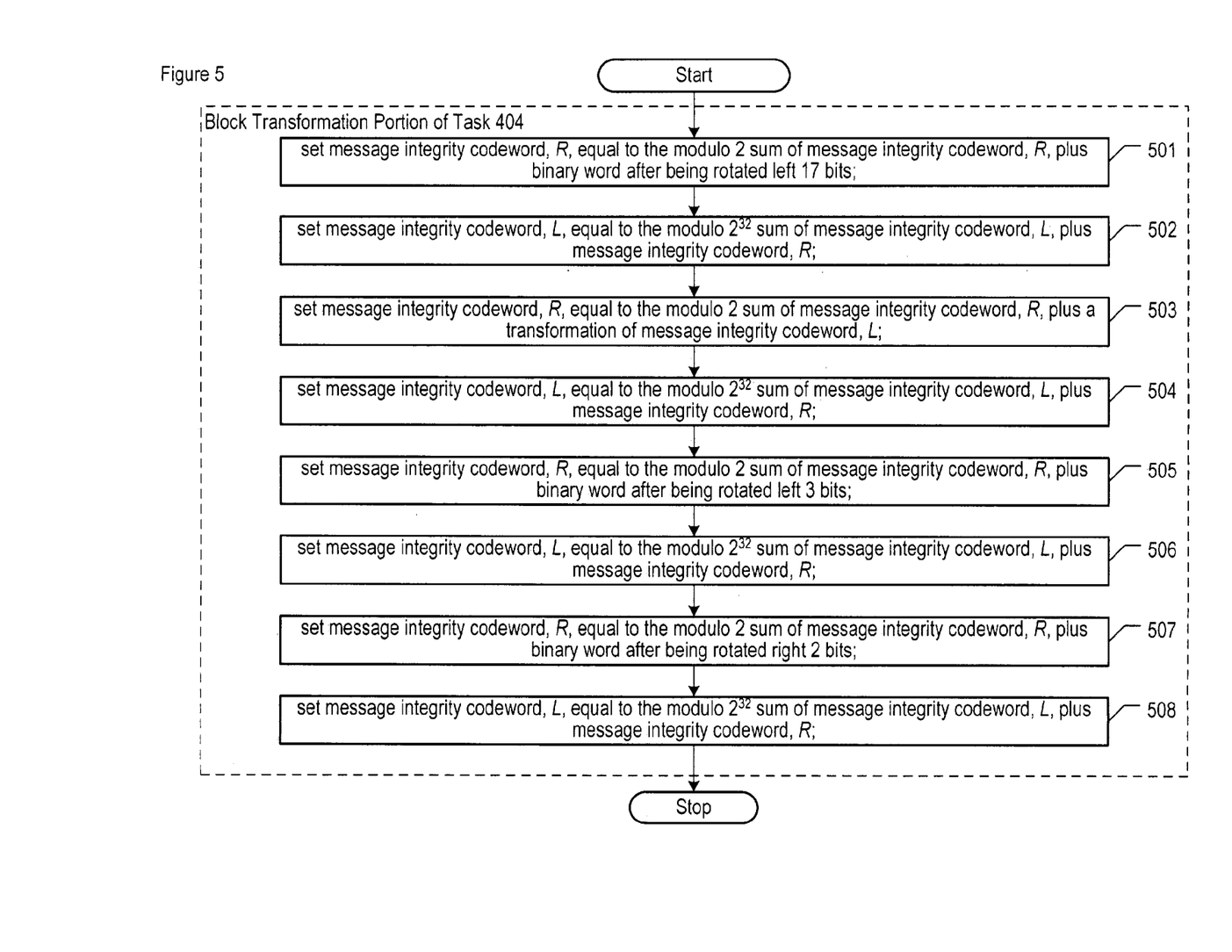
FIG. 5 depicts a block diagram of the salient subtasks performed in task 404.

FIG. 5 depicts a block diagram of the salient subtasks performed in task 404.

At subtask 501, message integrity codeword generator 202 sets the first message integrity codeword, L, and the second message integrity codeword, R, by setting the second message integrity codeword, R, equal to the modulo 2 sum of the second message integrity codeword, R, plus the first message integrity codeword, L, after being rotated left 17 bits. This is shown in Equation 4.

$$R := R \oplus (L \Leftarrow 17) \tag{Eq. 4}$$

wherein the symbol $\Leftarrow$ represents the rotate left operator. It will be clear to those skilled in the art how to make and use alternative embodiments of the present invention in which the first message integrity codeword, L, is rotated a different number of bits or is rotated right.

At subtask 502, message integrity codeword generator 202 sets the first message integrity codeword, L, equal to the modulo $2^B$ sum of the first message integrity codeword, L, plus the second message integrity codeword, R, as shown in Equation 5.

$$L := (L+R) \bmod 2^B \tag{Eq. 5}$$

wherein the symbol + represents the summation operator.

At subtask 503, message integrity codeword generator 202 sets the second message integrity codeword, R, equal to the modulo 2 sum of the second message integrity codeword, R, plus a transposition of the first message integrity codeword, L, as shown in Equation 6.

$$R:=R \oplus XSWAP(L) \tag{Eq. 6}$$

wherein the transposition XSWAP(L) swaps the position of the two least significant bytes of L with each other and swaps the position of the two most significant bytes of L with each other.

At subtask 504, message integrity codeword generator 202 sets the first message integrity codeword, L, equal to the modulo $2^B$ sum of the first message integrity codeword, L, plus the second message integrity codeword, R, as shown in Equation 7.

$$L:=(L+R) \bmod 2^B \tag{Eq. 7}$$

At subtask 505, message integrity codeword generator 202 sets the second message integrity codeword, R, equal to the modulo 2 sum of the second message integrity codeword, R, plus the first message integrity codeword, L, after being rotated left 3 bits, as shown in Equation 8.

$$R:=R \oplus (L \Leftarrow 3) \tag{Eq. 8}$$

It will be clear to those skilled in the art how to make and use alternative embodiments of the present invention in which the first message integrity codeword, L, is rotated a different number of bits or is rotated right.

At subtask 506, message integrity codeword generator 202 sets the first message integrity codeword, L, equal to the modulo $2^B$ sum of the first message integrity codeword, L, plus the second message integrity codeword, R, as shown in Equation 9.

$$L:=(L+R) \bmod 2^B \tag{Eq. 9}$$

It will be clear to those skilled in the art how to make and use alternative embodiments of the present invention in which the first message integrity codeword, L, is rotated a different number of bits or is rotated right.

At subtask 507, message integrity codeword generator 202 sets the second message integrity-codeword, R, equal to the modulo 2 sum of the second message integrity codeword, R, plus the first message integrity codeword, L, after being rotated right 2 bits, as shown in Equation 10.

$$R:=R \oplus (L \Rightarrow 2) \tag{Eq. 10}$$

wherein the symbol $\Rightarrow$ represents the rotate right operator. It will be clear to those skilled in the art how to make and use alternative embodiments of the present invention in which the first message integrity codeword, L, is rotated a different number of bits or is rotated left.

At subtask 508, message integrity codeword generator 202 sets the first message integrity codeword, L, equal to the modulo $2^B$ sum of the first message integrity codeword, L, plus the second message integrity codeword, R, as shown in Equation 11.

$$L:=(L+R) \bmod 2^B \tag{Eq. 11}$$

Figure 6:
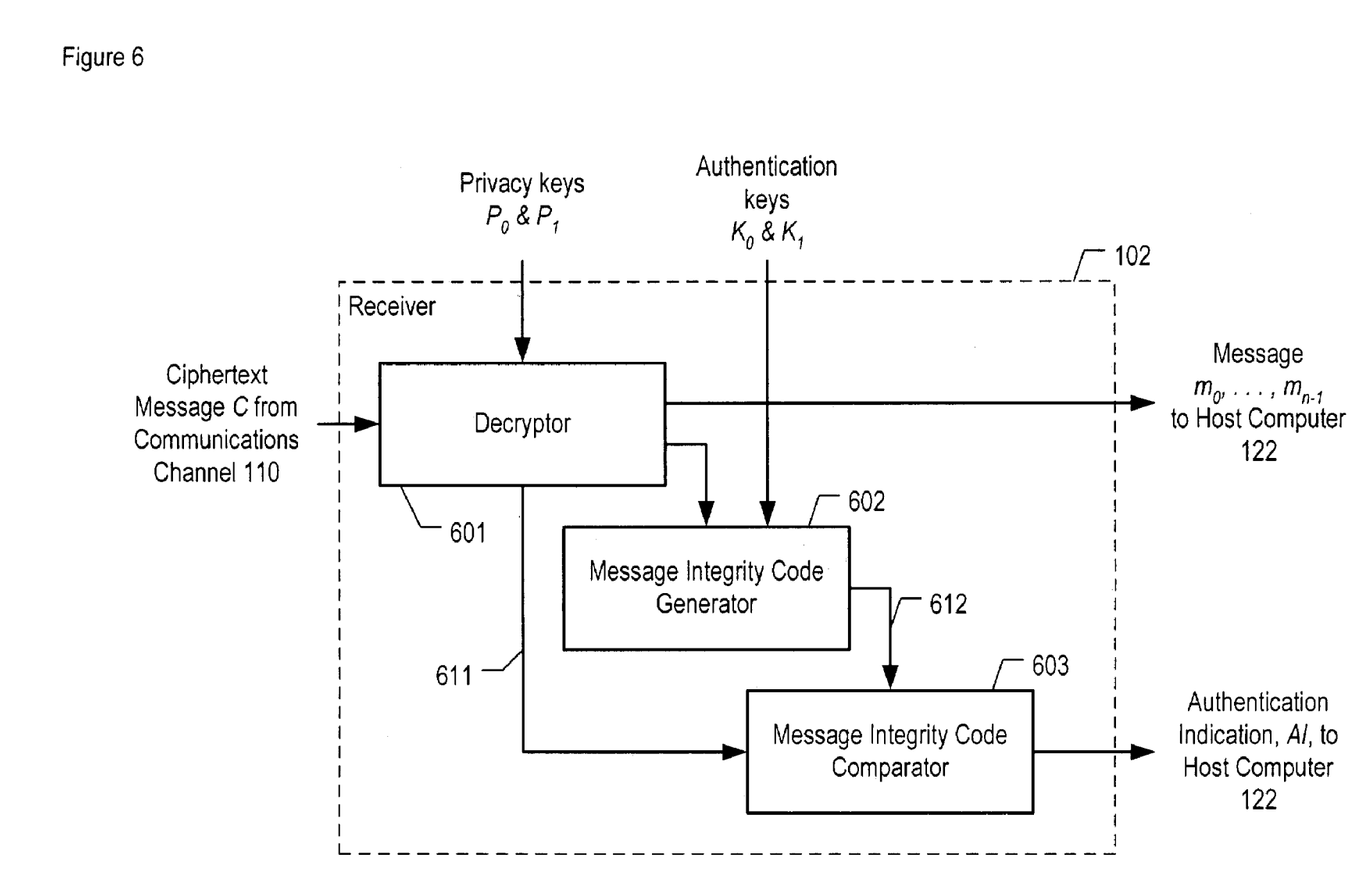
FIG. 6 depicts a block diagram of the salient components of receiver 102 in accordance with the illustrative embodiment of the present invention.

FIG. 6 depicts a block diagram of the salient components of receiver 102 in accordance with the illustrative embodiment of the present invention. Receiver 102 comprises decryptor 601, message integrity code generator 602, and message integrity code comparator 603. In accordance with the illustrative embodiment, decryptor 601 is implemented in special-purpose hardware, and message integrity code generator 602 and message integrity code comparator 603 are implemented in software on a general-purpose processor. It will be clear to those skilled in the art, however, after reading this disclosure, how to make and use alternative embodiments of the present invention in which decryptor 601, message integrity code generator 602, and message integrity code comparator 603 are implemented in any combination of software, general-purpose hardware, and special-purpose hardware. The operation of transmitter 201 is described in detail below and with respect to FIG. 7.

Figure 7:
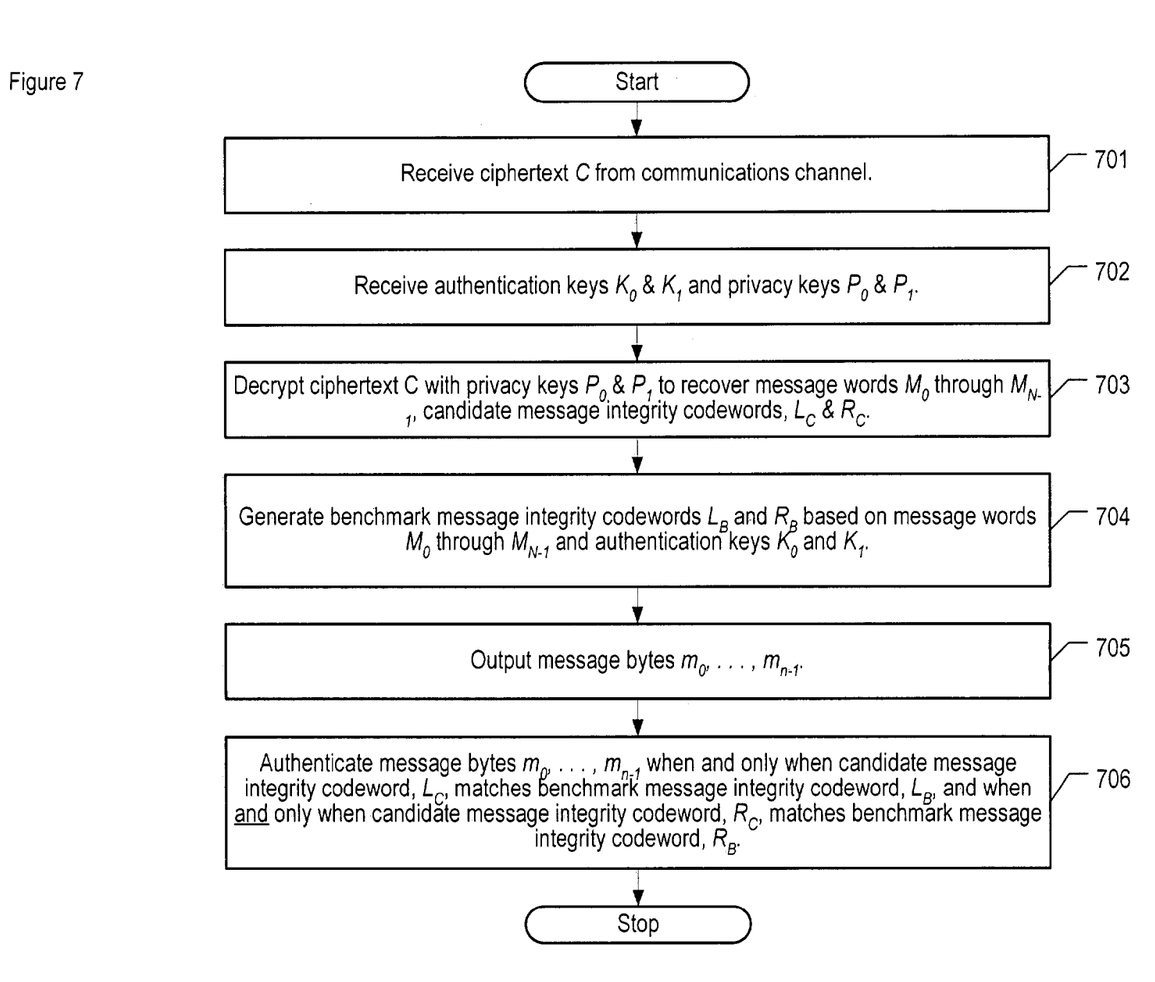
FIG. 7 depicts a flowchart of the salient tasks performed by receiver 102 in accordance with the illustrative embodiment of the present invention.

FIG. 7 depicts a flowchart of the salient tasks performed by receiver 102 in accordance with the illustrative embodiment of the present invention.

At task 701, decryptor 601 receives the ciphertext message C from communications channel 110, in well-known fashion.

At task 702, decryptor 601 and message integrity code generator 602 receive the first authentication key, $K_0$, and the second key, $K_1$. It will be clear to those skilled in the art that tasks 701 and 702 can be performed concurrently or in a different order in some alternative embodiments of the present invention.

At task 703, decryptor 601 decrypts the ciphertext message C with the privacy keys $P_0$ and $P_1$, as the key to recover the candidate message words $M_0, \ldots, M_{N-1}$, the candidate message integrity codewords $L_C$ and $R_C$. The recovered message words and message integrity codewords are called "candidate" words and codewords at this point because they might have been fabricated by a spoofer and have not yet been authenticated by receiver 102. As part of task 703, decryptor 601 feeds the candidate message words $M_0, \ldots, M_{N-1}$ to message integrity codeword generator 602 and feeds the candidate message integrity codewords $L_C$ and $R_C$ to message integrity codeword comparator 603.

At task 704, message integrity codeword generator 602 generates the first benchmark message integrity codeword, $L_B$, and the second benchmark message integrity codeword, $R_B$, based on the candidate message words $M_0, \ldots, M_{N-1}$, and the authentication keys $K_0$ and $K_1$. The function of message integrity codeword generator 602 is identical to the function performed by message integrity codeword generator 202, and task 704 is identical to task 304. The generated message integrity codewords $L_B$ and $R_B$ are called "benchmark" codewords because they are the touchstone against which receiver 102 will judge the authenticity of the candidate codewords $L_C$ and $R_C$ recovered in task 703.

At task 705, decryptor 601:

(i) depads the candidate message words $M_0, \ldots, M_{N-1}$ to produce the candidate message, $m_0, \ldots, M_{n-1}$;

(ii) outputs the candidate message, $m_0, \ldots, m_{n-1}$ to host computer 122;

(iii) outputs the candidate message words $M_0, \ldots, M_{N-1}$ to message integrity codeword generator 602, and (iv) outputs the benchmark message integrity codewords $L_B$ and $R_B$ to message integrity codeword comparator 603.

At task 706, message integrity codeword comparator 603 authenticates the candidate message words $M_0, \ldots, M_{N-1}$ when and only when:

1. the first benchmark message integrity codeword, $L_B$, equals the first candidate message integrity codeword, $L_C$, and 2. The second benchmark message integrity codeword, $R_B$, equals the second candidate message integrity codeword, $R_C$.

As part of task 706, message integrity codeword comparator 603 outputs the authentication indication, AI, that indicates whether or not the candidate message words $M_0, \ldots, M_{N-1}$ output in task 705 are authenticated or not.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method, comprising:
   converting a message to a sequence of message words using a message padder;
   generating a first message integrity codeword, L, and a second message integrity codeword, R, based on the message words and respective first authentication key, $K_0$, and second authentication key, $K_1$, the generating based on operations comprising modulo 2 sum, modulo $2^B$ sum, bit rotation, and block transformation, where B is a positive integer, wherein generating comprises setting the second message integrity codeword, R, equal to the modulo 2 sum of the second message integrity codeword, R, plus the first message integrity codeword, L, after being rotated left 17 bits; and
   transmitting a cyphertext message based on the first and second message integrity codewords and the message words over a communications medium to a receiver.

2. The method of claim 1, further comprising encrypting the message words and the first and second message integrity codewords with first and second privacy keys to provide the ciphertext message.

3. The method of claim 2, wherein generating comprises:
   setting the first message integrity codeword, L, equal to the modulo $2^B$ sum of the first message integrity codeword, L, plus the second message integrity codeword, R;
   setting the second message integrity codeword, R, equal to the modulo 2 sum of the second message integrity codeword, R, plus a transposition of the first message integrity codeword, L;
   setting the first message integrity codeword, L, equal to the modulo $2^B$ sum of the first message integrity codeword, L, plus the second message integrity codeword, R;
   setting the second message integrity codeword, R, equal to the modulo 2 sum of the second message integrity codeword, R, plus the first message integrity codeword, L, after being rotated left 3 bits;
   setting the first message integrity codeword, L, equal to the modulo $2^B$ sum of the first message integrity codeword, L, plus the second message integrity codeword, R;
   setting the second message integrity codeword, R, equal to the modulo 2 sum of the second message integrity codeword, R, plus the first message integrity codeword, L, after being rotated right 2 bits; and
   setting the first message integrity codeword, L, equal to the modulo $2^B$ sum of the first message integrity codeword, L, plus the second message integrity codeword, R.

4. The method of claim 3, wherein the transposition of the first message integrity codeword, L, swaps the position of the two least significant bytes of L with each other and swaps the position of the two most significant bytes of L with each other.

5. The method of claim 1, wherein generating comprises:
   setting the first message integrity codeword, L, equal to the first authentication key, $K_0$, and the second message integrity codeword, R, equal to the second key, $K_1$; and
   iteratively for i=0 through n,
   setting the first message integrity codeword, L, equal to the modulo 2 sum of the first message integrity codeword, L, plus the message word, $M_i$, and
   setting the first message integrity codeword, L, and the second message integrity codeword, R, equal to a block transformation of the first message integrity codeword, L, and the second message integrity codeword, R.

6. The method of claim 5, wherein the block transformation comprises:
   setting the first message integrity codeword, L, equal to the modulo $2^B$ sum of the first message integrity codeword, L, plus the second message integrity codeword, R;
   setting the second message integrity codeword, R, equal to the modulo 2 sum of the second message integrity codeword, R, plus a transposition of the first message integrity codeword, L;
   setting the first message integrity codeword, L, equal to the modulo $2^B$ sum of the first message integrity codeword, L, plus the second message integrity codeword, R;
   setting the second message integrity codeword, R, equal to the modulo 2 sum of the second message integrity codeword, R, plus the first message integrity codeword, L, after being rotated left 3 bits;
   setting the first message integrity codeword, L, equal to the modulo $2^B$ sum of the first message integrity codeword, L, plus the second message integrity codeword, R;
   setting the second message integrity codeword, R, equal to the module 2 sum of the second message integrity codeword, R, plus the first message integrity codeword, L, after being rotated right 2 bits; and
   setting the first message integrity codeword, L, equal to the modulo $2^B$ sum of the first message integrity codeword, L, plus the second message integrity codeword, R.

7. The method of claim 6, wherein the transposition of the first message integrity codeword, L, swaps the position of the two least significant bytes of L with each other and swaps the position of the two most significant bytes of L with each other.

8. The method of claim 5, further comprising:
   deciphering a ciphertext message using a first privacy key, $P_0$, and a second privacy key, $P_1$ to recover message words and candidate message integrity codewords $L_C$ and $R_C$;
   generating benchmark message integrity codewords $L_B$ and $R_B$ based on the message words and a first authentication key, $K_0$, and a second authentication key, $K_1$, the benchmark message integrity codewords $L_B$ and $R_B$ potentially corresponding to the candidate message integrity codewords $L_C$ and $R_C$, respectively; and
   authenticating message bytes corresponding to the message words based on a comparison of the respective candidate message integrity codewords $L_C$ and $R_C$ and the benchmark message integrity codewords $L_B$ and $R_B$.

9. The method of claim 8, wherein authenticating comprises authenticating the message bytes when and only when the candidate message integrity codeword $L_C$ matches the benchmark message integrity codeword $L_B$, and when and only when the candidate message integrity codeword $R_C$ matches the benchmark message integrity codeword $R_B$.

10. The method of claim 8, wherein deciphering comprises decrypting the ciphertext message with the first privacy key, $P_0$, and the second privacy key, $P_1$ to recover N message words $M_0$ through $M_{N-1}$.

11. The method of claim 8, wherein deciphering comprises generating the first candidate message integrity codeword, $L_C$, and said second candidate message integrity codeword, $R_C$, the generating of the first candidate message integrity codeword, $L_C$, and said second candidate message integrity codeword, $R_C$ comprising:

setting said first candidate message integrity codeword, $L_C$, equal to said first authentication key, $K_0$, and said second message integrity codeword, $R_C$, equal to said second key, $K_1$, and iteratively for i=0 through n, setting said first candidate message integrity codeword, $L_C$, equal to the modulo 2 sum of said first candidate message integrity codeword, $L_C$, plus said message word $M_i$, and setting said first candidate message integrity codeword, $L_C$, and said second candidate message integrity codeword, $R_C$, equal to a block transformation of said first candidate message integrity codeword, $L_C$, and said second candidate message integrity codeword, $R_C$.

12. The method of claim 11, wherein said block transformation comprises:

setting said first message integrity codeword, L, equal to the modulo $2^B$ sum of said first message integrity codeword, L, plus said second message integrity codeword, R, where B is a positive integer;

setting said second message integrity codeword, R, equal to the modulo 2 sum of said second message integrity codeword, R, plus a transposition of said first message integrity codeword, L;

setting said first message integrity codeword, L, equal to the modulo $2^B$ sum of said first message integrity codeword, L, plus said second message integrity codeword, R;

setting said second message integrity codeword, R, equal to the modulo 2 sum of said second message integrity codeword, R, plus said first message integrity codeword, L, after being rotated left 3 bits;

setting said first message integrity codeword, L, equal to the modulo $2^B$ sum of said first message integrity codeword, L, plus said second message integrity codeword, R;

setting said second message integrity codeword, R, equal to the modulo 2 sum of said second message integrity codeword, R, plus said first message integrity codeword, L, after being rotated right 2 bits; and setting said first message integrity codeword, L, equal to the modulo $2^B$ sum of said first message integrity codeword, L, plus said second message integrity codeword, R.

13. The method of claim 12, wherein said transposition of said first message integrity codeword, L, swaps the position of the two least significant bytes of L with each other and swaps the position of the two most significant bytes of L with each other.

14. The method of claim 8, wherein the deciphering is based on operations comprising modulo 2 sum, modulo $2^B$ sum, bit rotation, and block transformation, where B is a positive integer comprising.

15. A system, comprising:

a transmitter comprising:

a message padder configured to convert a message to a sequence of message words; and a message integrity code generator configured to generate a first message integrity codeword, L, and a second message integrity codeword, R, based on the message words and respective first authentication key, $K_0$, and second authentication key, $K_1$, the generating based on operations comprising modulo 2 sum, modulo $2^B$ sum, bit rotation, and block transformation, where B is a positive integer, wherein the message integrity code generator is further configured to implement the block transformation by setting the second message integrity codeword, R, equal to the modulo 2 sum of the second message integrity codeword, R, plus the first message integrity codeword, L, after being rotated left 17 bits, wherein the transmitter is further configured to transmit a cyphertext message based on the first and second message integrity codewords and the message words over a communications medium to a receiver.

16. The system of claim 15, the transmitter further comprising an encryptor, the encryptor configured to encrypt the message words and the first and second message integrity codewords with first and second privacy keys to provide a ciphertext message.

17. The system of claim 16, wherein the message integrity code generator is further configured to generate by:

setting the first message integrity codeword, L, equal to the first authentication key, $K_0$, and the second message integrity codeword, R, equal to the second key, $K_1$; and iteratively for i=0 through n, setting the first message integrity codeword, L, equal to the modulo 2 sum of the first message integrity codeword, L, plus the message word, $M_i$, and setting the first message integrity codeword, L, and the second message integrity codeword, R, equal to a block transformation of the first message integrity codeword, L, and the second message integrity codeword, R.

18. The system of claim 15, wherein the message integrity code generator is further configured to implement the block transformation by:

setting the first message integrity codeword, L, equal to the modulo $2^B$ sum of the first message integrity codeword, L, plus the second message integrity codeword, R;

setting the second message integrity codeword, R, equal to the modulo 2 sum of the second message integrity codeword, R, plus a transposition of the first message integrity codeword, L;

setting the first message integrity codeword, L, equal to the modulo $2^B$ sum of the first message integrity codeword, L, plus the second message integrity codeword, R;

setting the second message integrity codeword, R, equal to the modulo 2 sum of the second message integrity codeword, R, plus the first message integrity codeword, L, after being rotated left 3 bits;

setting the first message integrity codeword, L, equal to the modulo $2^B$ sum of the first message integrity codeword, L, plus the second message integrity codeword, R;

setting the second message integrity codeword, R, equal to the modulo 2 sum of the second message integrity codeword, R, plus the first message integrity codeword, L, after being rotated right 2 bits; and setting the first message integrity codeword, L, equal to the modulo $2^B$ sum of the first message integrity codeword, L, plus the second message integrity codeword, R, wherein the transposition of the first message integrity codeword, L, swaps the position of the two least significant bytes of L with each other and swaps the position of the two most significant bytes of L with each other.

19. The system of claim 15, further comprising a receiver, the receiver comprising:

a decryptor configured to receive a ciphertext message over a communication medium from the transmitter, the decryptor configured to decipher the ciphertext message using a first privacy key, $P_0$, and a second privacy key, $P_1$ to recover message words and candidate message integrity codewords $L_C$ and $R_C$;

a second message integrity code generator configured to generate benchmark message integrity codewords $L_B$ and $R_B$ based on the message words and a first authentication key, $K_0$, and a second authentication key, $K_1$, the benchmark message integrity codewords $L_B$ and $R_B$ potentially corresponding to the candidate message integrity codewords $L_C$ and $R_C$, respectively; and a message integrity code comparator configured to authenticate message bytes corresponding to the message words based on a comparison of the respective candidate message integrity codewords $L_C$ and $R_C$ and the benchmark message integrity codewords $L_B$ and $R_B$.

* * * * *

UNITED STATES PATENT AND TRADEMARK OFFICE
CERTIFICATE OF CORRECTION

PATENT NO. : 7,343,011 B2  Page 1 of 1
APPLICATION NO. : 10/424803
DATED : March 11, 2008
INVENTOR(S) : Ferguson It is certified that error appears in the above-identified patent and that said Letters Patent is hereby corrected as shown below:

Column 7, line 27 should read --...transmitting a ciphertext message based on the first and...--

Column 9, lines 66-67 should read --...sum, bit rotation, and block transformation, where B is a positive integer."

Column 10, line 20 should read --...ciphertext message based on the first and second...--

Column 10, lines 26-27 should read --...codewords with first and second privacy keys to provide the ciphertext message.--

Signed and Sealed this

Eighth Day of July, 2008

JON W. DUDAS
*Director of the United States Patent and Trademark Office*